(12) United States Patent
Pittman, Sr. et al.

(10) Patent No.: US 6,276,111 B1
(45) Date of Patent: Aug. 21, 2001

(54) STRUCTURAL JOINT ASSEMBLY AND METHOD THEREFOR

(76) Inventors: Max Joseph Pittman, Sr.; Max Joseph Pittman, Jr., both of Rte. 3, Box 438, Cuthbert, GA (US) 31740

( * ) Notice: Subject to any disclaimer, the term of this patent is extended or adjusted under 35 U.S.C. 154(b) by 0 days.

(21) Appl. No.: 09/239,115

(22) Filed: Jan. 28, 1999

(51) Int. Cl.$^7$ ...................................................... E04B 1/18
(52) U.S. Cl. ...................... 52/741.1; 52/653.2; 52/655.1; 52/726.1; 52/730.4; 52/656.9; 403/205
(58) Field of Search ............................... 52/653.2, 655.1, 52/656.9, 726.1, 726.2, 726.3, 16, 736.1, 730.4, 730.5, 731.2, 731.3, 741.1; 135/121, 114, 68; 403/205; 285/424, 183

(56) References Cited

U.S. PATENT DOCUMENTS

| | | | |
|---|---|---|---|
| 470,514 | * 3/1892 | Simpson | 135/114 X |
| 1,067,172 | * 7/1913 | Holub | 285/424 X |
| 1,440,273 | * 12/1922 | Carman | 285/424 X |
| 2,282,433 | * 5/1942 | Soderquist | 135/97 |
| 2,477,315 | * 7/1949 | Smith | 285/183 |
| 2,650,114 | * 8/1953 | Epstein | 285/424 X |
| 2,963,783 | * 12/1960 | Field | 285/183 |
| 3,492,772 | 2/1970 | Bergman . | |
| 3,722,167 | 3/1973 | Rousey . | |
| 3,731,958 | * 5/1973 | Offenbroich | 403/280 |
| 3,829,999 | * 8/1974 | Bernstein . | |
| 4,060,885 | * 12/1977 | Hoffman et al. | 29/407.08 |
| 4,069,638 | * 1/1978 | Hasselqvist et al. | 52/726.2 |
| 4,120,998 | 10/1978 | Olez . | |
| 4,516,376 | * 5/1985 | King | 52/655.1 |
| 4,523,780 | * 6/1985 | Cheer | 285/424 X |
| 4,570,408 | 2/1986 | Frascaroli et al. . | |
| 4,667,530 | * 5/1987 | Mettler et al. | 403/359 X |
| 4,685,262 | 8/1987 | Meredith, Jr. . | |
| 4,798,028 | * 1/1989 | Pinion | 52/16 |
| 5,059,056 | 10/1991 | Banthia et al. . | |
| 5,228,259 | * 7/1993 | Haddad et al. | 52/653.2 |
| 5,243,874 | * 9/1993 | Wolfe et al. | 74/493 |
| 5,406,756 | * 4/1995 | Bemis et al. | 52/16 |
| 5,450,701 | 9/1995 | White . | |
| 5,458,393 | * 10/1995 | Benedyk | 296/203 |
| 5,517,928 | * 5/1996 | Erdman | 108/180 |
| 5,546,722 | 8/1996 | Huang . | |
| 5,735,085 | * 4/1998 | Denooy | 52/16 |
| 6,041,556 | * 3/2000 | Keller | 52/16 X |
| 6,102,605 | * 8/2000 | Emmons | 403/217 |

* cited by examiner

Primary Examiner—Carl D. Friedman
Assistant Examiner—Brian E. Glessner
(74) Attorney, Agent, or Firm—Rodgers & Rodgers

(57) ABSTRACT

A structural joint assembly is provided and comprises a pair of quadrilateral elongated hollow elements with one end of one of the elements being swaged, the swaged end of one element and the unswaged end of the other element being disposed in a telescoping relation, and the two elements being interconnected.

4 Claims, 3 Drawing Sheets

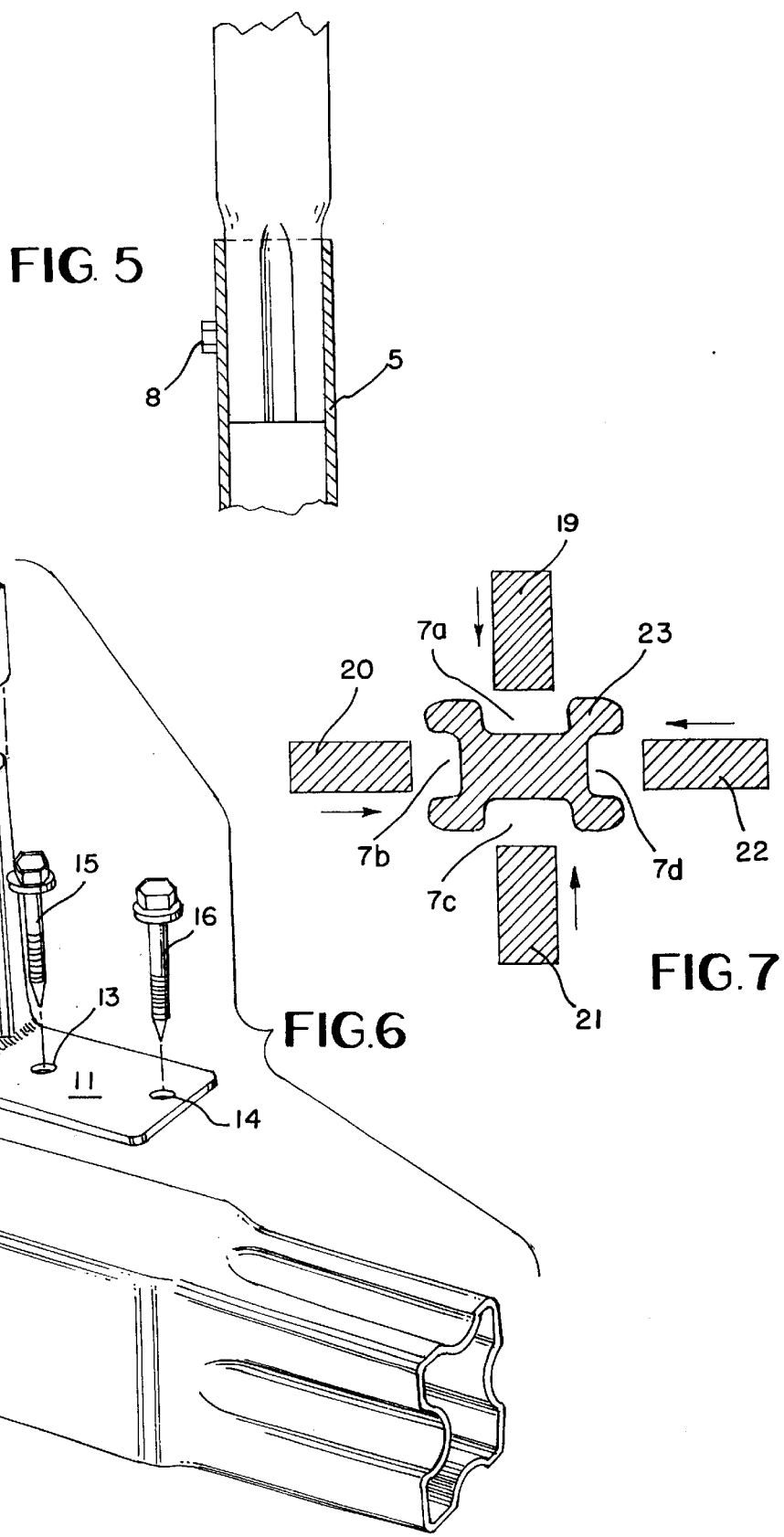

STRUCTURAL JOINT ASSEMBLY AND METHOD THEREFOR

BACKGROUND OF THE INVENTION

In the construction industry, it is vital that simplicity and efficiency be maintained while at the same time assuring that structural integrity is not compromised. The essence of any structure is the frame which comprises multiple longitudinal frame elements which are joined together by various means. Clearly, these joints are critically important.

A wide variety of construction joints are known in the construction industry all of which achieve varying degrees of strength and stability. It is well known to form a frame structure from tubular elements joined together by means of a variety of joint assemblies. It is also well known that quadrilateral frame elements are more desirable than tubular elements due to increased resistance to bending or other structural failure but experience has shown that to join quadrilateral frame elements has been unreliable, inefficient and time consuming.

SUMMARY OF THE INVENTION

In accordance with this invention, an improved structural joint assembly is provided and includes a first quadrilateral elongated hollow element, a second quadrilateral elongated hollow element, one end of one of the elements being swaged, and the swaged end being disposed in a telescoping relation with respect to one end of the other element.

BRIEF DESCRIPTION OF THE DRAWINGS

In the drawings,

FIG. 5 is a cross-section of a completed joined;

FIG. 6 is an exploded view of a further modification of the invention; and

FIG. 7 is a schematic view depicting the method by which a structural joint according to this invention is formed.

DESCRIPTION OF THE PREFERRED EMBODIMENT

Figure 1:
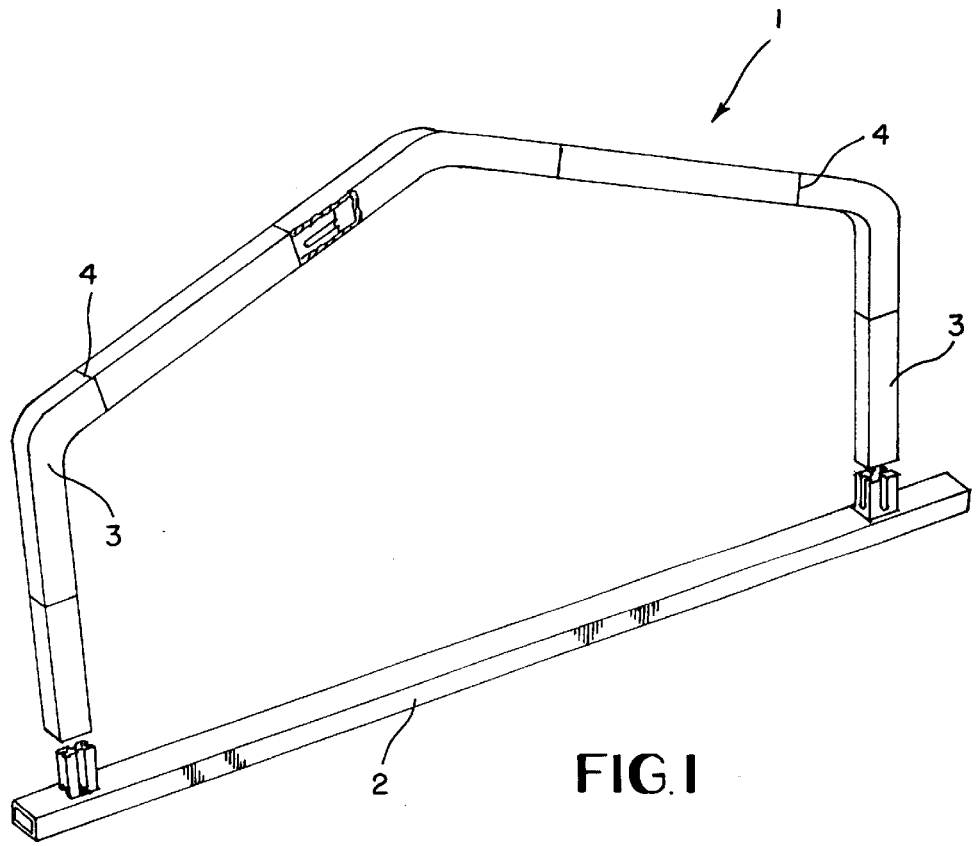
FIG. 1 is a partially exploded perspective view of a frame structure formed according to this invention.

In the drawings and with particular reference to FIG. 1, the numeral 1 generally designates a typical building frame structure. More particularly, frame structure 1 comprises base 2 with multiple interconnected elongated frame elements 3 upstanding therefrom. Each frame element is interconnected to the adjoining element at joints 4.

Figure 2:
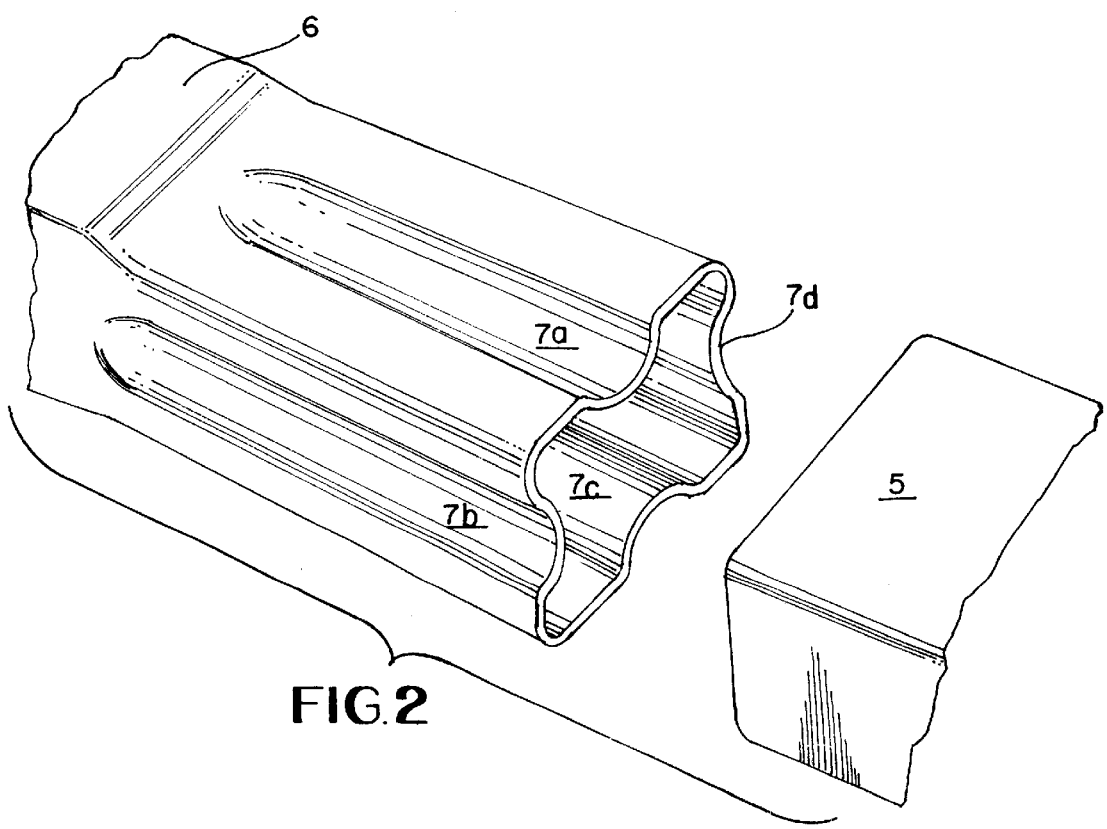
FIG. 2 is an enlarged exploded perspective view of a joint.

In FIG. 2, joints 4 are shown in more detail by which quadrilateral elongated hollow element 5 is provided and which is open at both ends thereof. Corresponding quadrilateral elongated hollow element 6 is provided with one end thereof swaged such that arcuate indentations 7a, 7b, 7c and 7d are formed in the respective walls of element 6. By this means, the cross-sectional profile of quadrilateral element 6 is reduced so that the swaged end can be inserted into the adjacent unswaged open end of quadrilateral element 5. In order to secure the joint, self-tapping screw 8 is provided in known fashion to interlock elements 5 and 6. The joint then appears as shown in FIG. 5.

Figure 3:
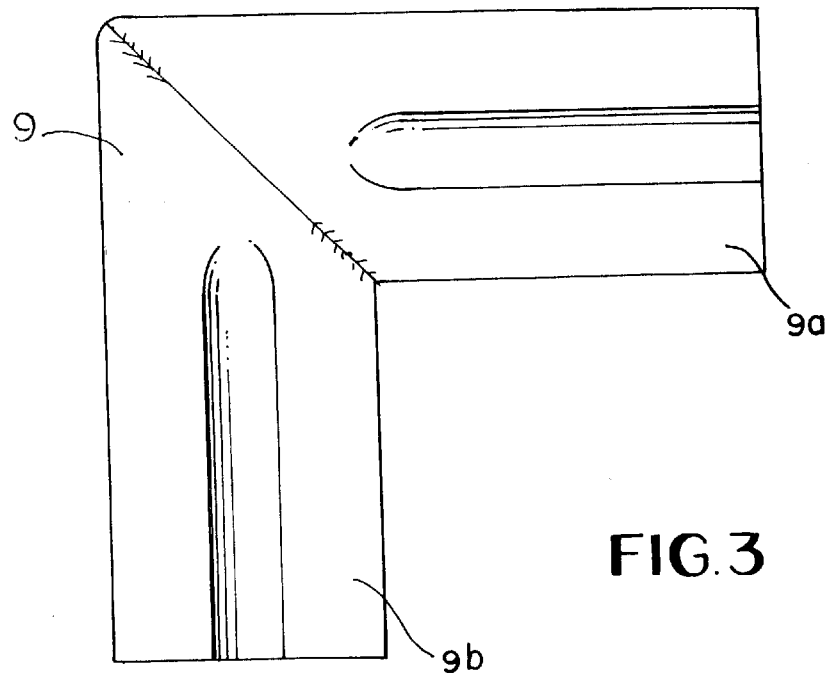
FIGS. 3 and 4 are modified versions of one element of this invention.
Figure 4:
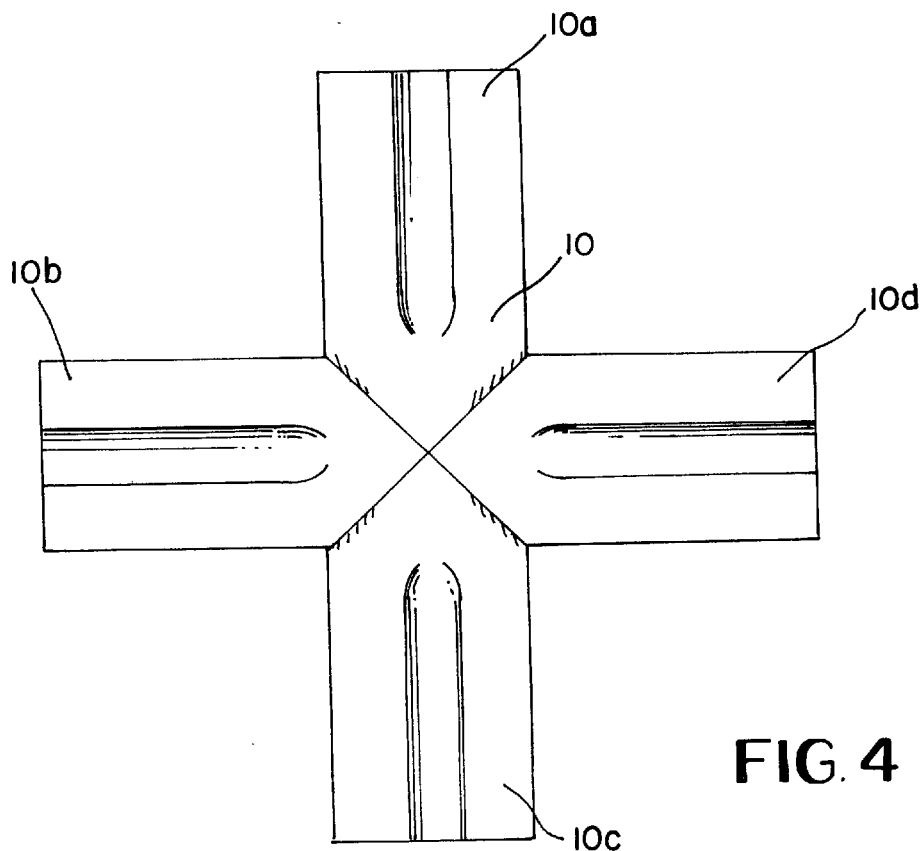

In FIGS. 3 and 4, modified forms of the invention are shown wherein in FIG. 3 L-shaped quadrilateral element 9 comprises swaged branches 9a and 9b and wherein FIG. 4 depicts X-shaped quadrilateral element 10 having swaged branches 10a, 10b, 10c, and 10d. Therefore, the swaged branches, shown in FIGS. 3 and 4, are inserted into unswaged openings of corresponding quadrilateral elements, as previously described, thus allowing the construction of frame structures having a variety of desired configurations.

Another feature of this invention is shown in FIG. 6 wherein anchoring extension 11 is provided and which is suitably attached to swaged element 12 by any suitable means such as welding and the like. Holes 13 and 14 are formed in anchoring extension 11 and adapted to receive self-tapping screws 15 and 16 and anchoring extension 11 is interconnectable to an adjoining structural element 17. Therefore, by this means, element 12 is secured to element 17 by simply inserting screw 15 through holes 13 and, similarly, inserting screw 16 through holes 14 and driving self-tapping screws through element 17, as is well known.

To complete the assembly, unswaged portion 18 is slipped over swaged portion element 12 and can be interlocked thereto, as previously described. By this means, a secured joint having a right angle configuration is provided. Of course, anchoring extension 11 can be rotated through an arc of 270 degrees to provide any of a number of variously configured angular joints.

In FIG. 7. the process of forming the swaged end of a quadrilateral tubular element is depicted wherein mandrels 19, 20, 21, and 22 are simultaneously moved in an inward direction with respect to hollow quadrilateral element 23 to form indentations 7a, 7b, 7c and 7d as shown and described in connection with FIG. 2.

What is claimed is:

1. A method of forming a structural joint assembly comprising the steps of forming two hollow elongated quadrilateral elements, swaging one end of one of said elements by simultaneously compressing each wall respectively by means of a mandrel at said one end of one of said elements to form an indention in each wall generally at the midpoint thereof, and telescoping said swaged end with one end of the other of said elements.

2. A method according to claim 1, and further comprising the step of interconnecting said swaged portion of said one element and the corresponding end of the other of said elements by means of a self-tapping screw.

3. A method according to claim 1, and further comprising the step of attaching an anchoring extension to an end of said one element.

4. A method according to claim 3, and further comprising the step of forming said anchoring extension at a 90 degree angle to said one element.

* * * * *